United States Patent
Melen

(10) Patent No.: US 6,665,290 B1
(45) Date of Patent: Dec. 16, 2003

(54) DATA COMMUNICATION METHOD AND APPARATUS

(75) Inventor: Björn Melen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/330,179

(22) Filed: Jun. 11, 1999

(30) Foreign Application Priority Data

Jun. 12, 1998 (FI) ................................................ 981363

(51) Int. Cl.⁷ .............................................. H04L 12/66
(52) U.S. Cl. ....................................... 370/352; 370/468
(58) Field of Search ................................ 370/352, 328, 370/351–356, 400, 468, 401

(56) References Cited

U.S. PATENT DOCUMENTS

| | | | | |
|---|---|---|---|---|
| 5,171,690 A | | 12/1992 | Ylosjoki | 370/389 |
| 6,064,653 A | * | 5/2000 | Farris | 370/237 |
| 6,145,002 A | * | 11/2000 | Srinivassan | 709/225 |
| 6,189,042 B1 | * | 2/2001 | Keller-Tuberg | 709/238 |
| 6,253,188 B1 | * | 6/2001 | Witek et al. | 705/27 |
| 6,359,880 B1 | * | 3/2002 | Curry et al. | 370/352 |

FOREIGN PATENT DOCUMENTS

| | | |
|---|---|---|
| WO | WO98/20653 | 5/1998 |
| WO | WO98/45984 | 10/1998 |
| WO | WO98/54868 | 12/1998 |
| WO | WO99/66689 | 12/1999 |

OTHER PUBLICATIONS

International Telecommunication Union, CCITT, E. 164, pp. 6–23, Geneva, 1991.

Jari Arkko et al. "*Dial–up Service via the Integrated Access System,*" Ericsson Review, Internet Acess Services, pp. 14–19, 1998.

* cited by examiner

Primary Examiner—Kenneth Vanderpuye

(57) ABSTRACT

A method of connecting a PC (1) to the Internet (10), wherein the connection is made through a telephone network exchange (5) and one of a plurality of Internet Access Servers (IASs, 8) coupled to the Internet (10). The method comprises receiving an initial Internet access request from the PC (1), the request being directed to a first B-number predefined at the PC (1). In response to the initial request, a first B-channel on one of the IASs (8) is allocated to the PC (1). A new B-number is then sent to the PC (1) and subsequent Multilink data network access requests from the PC (1) are directed to this new number. Requests made to the new number are recognized by the exchange (5) as Multilink requests and the subscriber is allocated further B-channels on the same IAS (8) from a reserved fraction.

11 Claims, 2 Drawing Sheets

DATA COMMUNICATION METHOD AND APPARATUS

FIELD OF THE INVENTION

The present invention relates to a data communications method and apparatus and in particular to a method and apparatus which make use of a switching centre having a plurality of data network access servers.

BACKGROUND OF THE INVENTION

The conventional way for a home user of a personal computer (PC) to access the Internet is to set up a telephone call, via his telephone operator, to an Internet service provider. The service provider allocates an Internet address to the PC ("subscriber terminal") for the duration of a session and acts as a protocol converter for data transmitted between the Internet and the subscriber terminal.

More recently, it has been proposed to combine the functionality of the Internet service provider into certain exchanges of the telephone network. An advantage of this is that the subscriber need only receive a single bill for both telephone calls and Internet access.

Exchanges provided with this facility are accessed by subscribers dialing a predefined access number. The exchanges contain "intelligence" which enables them to recognise that a call received to this number is an Internet access requests. In response, the exchange provides a connection between the subscriber terminal and the Internet via one of a number of so-called Internet Access Servers (IASs)—alternatively known as Network Access Servers (NASs).

The connection between the subscriber terminal and the IAS is a circuit switched connection, i.e. occupying reserved bandwidth, and utilises a Point-to-Point Protocol (PPP) such as is defined in RFC 1661. The reserved bandwidth comprises one Integrated Services Digital Network (ISDN) traffic channel (B-channel) providing a bandwidth of 64 Kbits/sec.

The number of IASs provided at an exchange determines the Internet access capacity of the exchange. However, using PPP, the bandwidth which can be accessed by an individual subscriber is limited to 64 Kbits/sec (i.e. one ISDN B-channel).

A Multilink PPP (RFC 1990 (1717)(1934)) has been proposed in order to provide further transmission bandwidth to subscriber terminals. This protocol uses a combination of two or more connections to provide a single larger channel. Considering for example the situation where the subscriber line to the exchange makes use of the Integrated Services Digital Network (ISDN) user-network interface, it is possible to make use of both of the communication B-channels available on the subscriber line for Internet access.

This works satisfactorily as long as all of the individual B-channels making up the multilink channel terminate at the same IAS. However, Multilink PPP cannot operate where individual B-channels are provided via different IAS, as the order of data packets sent between the Internet and the subscriber terminal may be lost due to variations in the transmission delays between different B-channels. Also, IP does not provide a mechanism whereby packets having the same IP address can be sent to different IASs.

It often transpires that when a low bandwidth access has been provided to a subscriber terminal, and that terminal subsequently requests additional bandwidth (i.e. using Multilink PPP), the allocated IAS cannot provide that bandwidth and multilink access cannot therefore be provided. Whilst it is possible to always reserve spare capacity on an IAS for a subscriber terminal already allocated a channel on that IAS, this may be wasteful of bandwidth resources.

This problem could be alleviated by increasing the capacity provided by an IAS. However, capacity is a function of processor power, power consumption, board size, etc. and cannot easily be achieved. An alternative solution which has been proposed involves connecting several IASs (which are usually provided in the form of printed circuit boards loaded into racks of an exchange) to a common multilane cell bus. The disadvantage of this solution is that the number of IAS which can be connected together in this way is limited (due to limits imposed by the capacity of the common bus) and also that a new inter-IAS communication protocol is required.

It is noted that similar problems arise in connecting a subscriber terminal to other types of data networks via data network access servers, where it is desired to utilise a multilink PPP.

SUMMARY OF THE INVENTION

It is an object of the present invention to overcome or at least mitigate the above noted disadvantages. In particular, it is an object of the present invention to provide a switching centre for connecting a user terminal to a data network using a multilink point-to-point data communications protocol.

According to a first aspect of the present invention there is provided a method of connecting a terminal to a data network, wherein the connection is made through one of a plurality of data network access servers coupled to the data network, the method comprising:

receiving an initial data network access request from the terminal, the request being directed to a first address predefined at the terminal;

in response to said initial request, allocating to the terminal a first transmission channel on one of the data network access servers for which the in-use fraction of the communication bandwidth is less than a predefined fraction;

delivering to the terminal a new data network access address;

receiving a subsequent access request from the terminal directed to said new address;

in response to said subsequent request, allocating to the terminal a further transmission channel on the data network access channel on which said first channel is already provided, even if the in-use fraction of the communication bandwidth of the data network access server exceeds said predefined fraction.

By ensuring that transmission bandwidth for a given terminal is always allocated on a single data network access server, embodiments of the present invention ensure that multilink point-to-point protocol can be used as the communication protocol between the terminal and the data network. Furthermore, by preventing access to a certain reserved fraction of the capacity of each network access server for first time requests, embodiments of the invention increase the probability that capacity will be available at a given network access server for multilink point-to-point protocol.

In certain embodiments of the invention, the data network is a wide area network such as the Internet, in which case the data network access servers are Internet access servers.

The network access servers may be provided at a single switching centre to which access requests from the subscriber terminal are directed. Alternatively, the network access servers may be distributed over several switching centres, where access requests are forwarded between switching centres depending upon demand.

The or each switching centre at which the data network access servers are provided may be an exchange of a telephone network in which case the terminal may be connected to the exchange(s) via a telephone line of the telephone network or via a wireless telephone communication channel. Preferably, said first and said new addresses are telephone numbers (B-numbers) which can be called by the terminal (see for example ITU-T, I.331,E.164).

The terminal may be connected to a further data network, e.g. a Local Area Network (LAN), and through that network to the switching centre(s).

The terminal may be a subscriber terminal on which is run a user application, e.g. a Web browser. Alternatively, the terminal may provide a routing functionality for other, end-user terminals connected to the first mentioned terminal by a Local Area Network (LAN) or a Wide Area Network (WAN).

According to a second aspect of the present invention there is provided apparatus for connecting a terminal to a data network, the apparatus comprising:

a plurality of data network access servers coupled to the data network;

first receiving means for receiving an initial data network access request from the terminal, the request being directed to a first address predefined at the terminal;

first control means arranged, in response to said initial request, to allocate to the terminal a first transmission channel on one of the data network access servers for which the in-use fraction of the communication bandwidth is less than a predefined fraction;

transmission means for transmitting to the terminal a new data network access address;

second receiving means for receiving a subsequent access request from the terminal directed to said new address; and second control means arranged, in response to said subsequent request, to allocate to the terminal a further transmission channel on the data network access server on which said first channel is already provided, even if the in-use fraction of the communication bandwidth of the data network access server exceeds said predefined fraction.

In one embodiment of the above second aspect of the present invention, the data network is the Internet and said data network access servers are Internet access servers. Preferably, the apparatus comprises a plurality of switching centres amongst which the Internet access servers are distributed. More preferably, the switching centres are exchanges of a telephone network, and the network comprises a telephone line, or wireless radio telephone link, coupling the terminal to the exchanges.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF THE EMBODIMENTS

Figure 1:
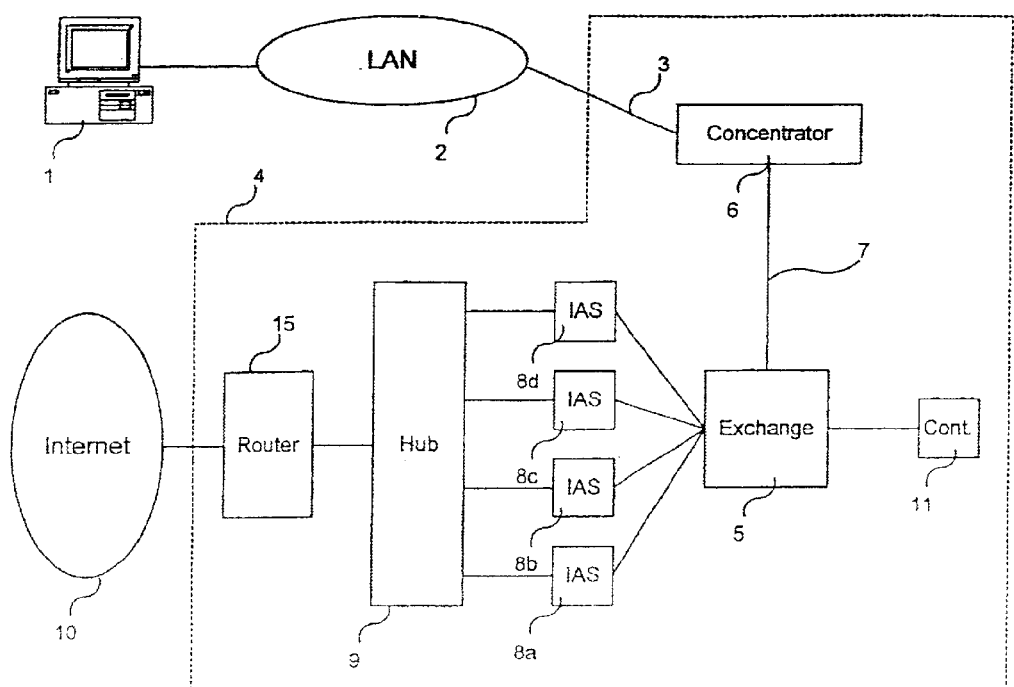
FIG. 1 shows schematically the architecture of a public telephone network connecting a subscriber terminal to the Internet.

There is illustrated in FIG. 1 a personal computer (PC) 1 which is connected to a Local Area Network (LAN) 2. The LAN 2 typically provides a data communication network for intra-office or intra-premise communication. The LAN 2 has a server (not shown in FIG. 1) which controls the LAN and connects it to a subscriber line 3 of a public telephone network 4.

A connection may be made between the subscriber line 3 and a switching exchange 5 of the network 4 via a concentrator 6. The concentrator receives many different subscriber lines and multiplexes/demultiplexes signals between those lines and a high capacity trunk line 7 connecting the concentrator 6 to the exchange 5. Connections between the concentrator 6 and the exchange 5 may sometimes make use of further, intermediate switching exchanges although these are not shown in FIG. 1. For the purpose of the present example, the telephone network 4 is assumed to use the Integrated Services Digital Network (ISDN) user-network interface for communications between the LAN 2 and the exchange 5.

The exchange 5 is coupled to a number (in this case four) of Internet Access Servers (IASs) 8a to 8d which in turn are connected in parallel to a hub 9. The hub 9 acts is a multplexer/demultiplexer between the IASs 8 and a router 15 via which the telephone network 4 is connected to the "open" Internet. Each IAS 8 is provided by a printed circuit board installed in a rack of the exchange 5.

Figure 2:
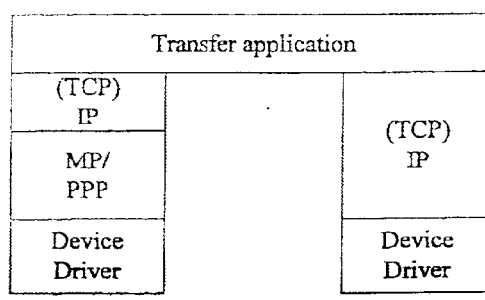
FIG. 2 illustrates generally the protocol stacks provided in Internet Access Servers of the network of FIG. 1.

The exchange 5 is connected to each IAS 8 by a line which provides 32 64 Kbits/sec channels. A subscriber terminal is allocated one of these channels on request, such that a circuit-switched connection can be established between the subscriber terminal 1 and an IAS 8. Point-to-Point Protocol (PPP) is used to establish (including allocating an IP address to the subscriber terminal) and control the channel between the subscriber terminal 1 and the allocated IAS 8. The protocol stacks present in the IAS 8 are illustrated in FIG. 2, where the left hand stack provides for communications with the subscriber terminal 1 whilst the right hand stack provides for communications with the Internet.

The exchange 5 has, or is connected to, a channel allocation controller 11 which may comprise a microprocessor or digital signal processor with associated memory. The controller 11 maintains a record or database of subscriber identities (i.e. subscriber line numbers) for which an active Internet connection currently exists and, for each such identity, the allocated bandwidth (i.e. number of B-channels) and IAS 8. The controller 11 also controls the allocation of IASs and transmission channels to subscriber lines in dependence upon the data stored in its database.

Figure 3:
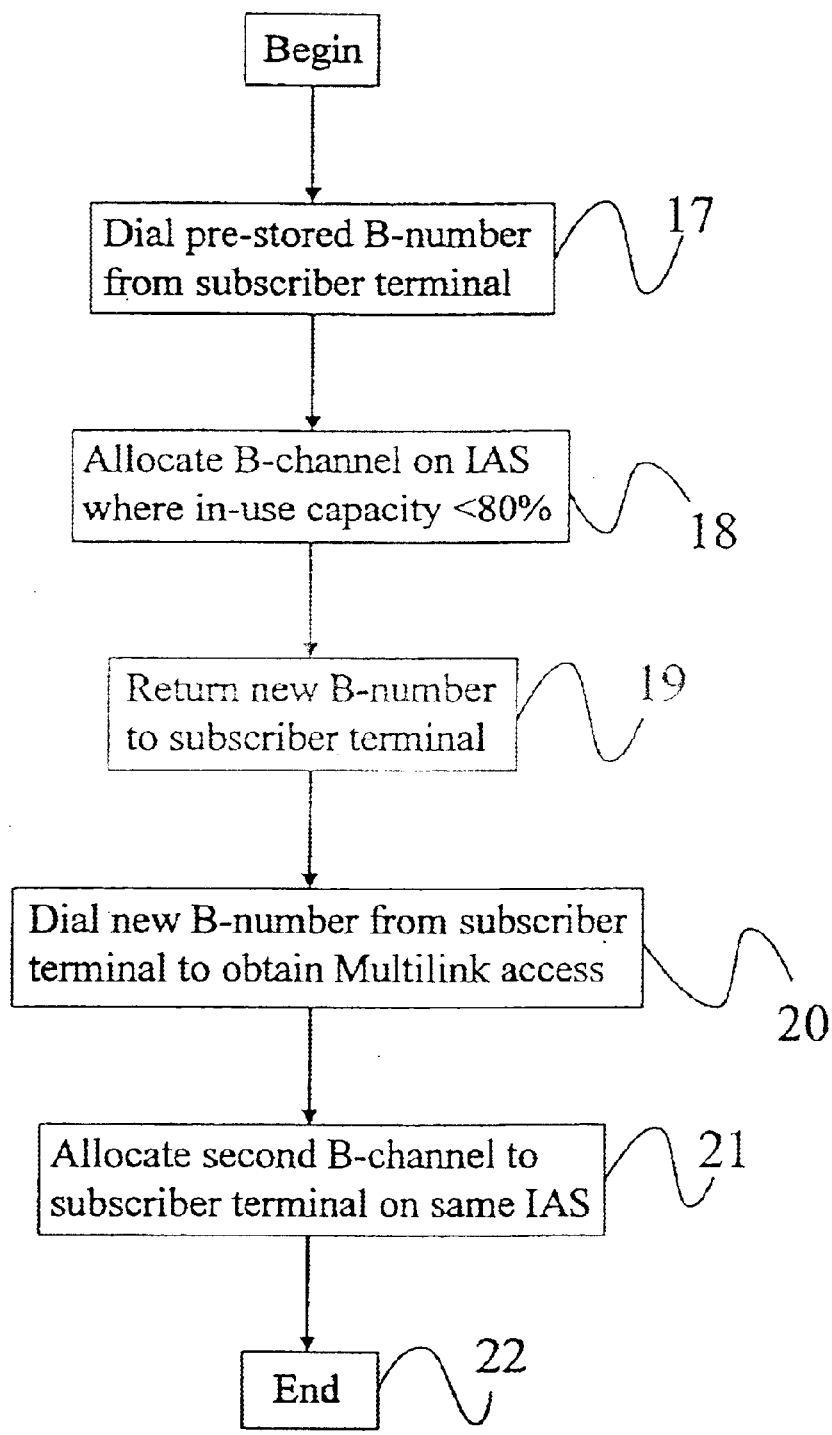
FIG. 3 is a flow chart illustrating the method of operation of the network of FIG. 1.

The operation of the network of FIG. 1 will now be described with reference to the flow diagram of FIG. 3. Consider firstly the case where a PC 1 requests (step 17) for the first time a low bandwidth Internet access, via the server in its LAN 2, and using one of the available ISDN B-communication channels. This request is made by dialing from the terminal a predefined telephone number (B-number) which routes the call and the request to exchange 5. The exchange recognizes the nature of the call and allocates to the subscriber a B-channel on a certain one of the IASs 8a (step 18).

Within each IAS 8, a predefined fraction of the total transmission capacity is reserved for multilink Internet access requests. For the purpose of this example, the reserved fraction is 20% although another suitable fraction may be chosen depending upon the expected relative demand for PPP and multilink PPP (MP). The B-channel allocation made by the controller 11 for a first-time request is therefore made from an IAS where the in-use capacity is less than 80%. The controller 11 then records the telephone number (A-number) of the caller together with the IAS 8a allocated to the subscriber. The PC 1 is then able to access the Internet using PPP.

The controller 11 then returns (step 19) to the PC 1 a new access request number (B-number) using multilink PPP. At the PC 1, this B-number temporarily replaces the previously used access number. The new B-number is effectively an access key for the subscriber terminal 1 to the reserved 20% of capacity at the IAS 8a on which the first B-channel was allocated.

In the event that the subscriber (PC 1) requires additional transmission bandwidth communication with the Internet, a new call (step 20) is made on the second ISDN B-communication channel to the new B-number and the request is passed to the exchange 5. The controller 11 recognizes that this is a request to use multilink PPP and moreover that the subscriber has the right to access the reserved 20% of capacity in the IAS 8a where the first channel already exists. A second B-channel is then allocated to the subscriber on the IAS 8a (step 21). Similarly, third fourth, etc. access requests (if possible) are directed to the new N-number on the basis of which the controller 11 allocates further B-channels to the subscriber on the IAS 8a.

When a connection is terminated (step 22), and a new first-time access request is made, the PC 1 reverts to the original pre-stored B-number to make the request.

It will be appreciated by the skilled person that various modifications may be made to the above described embodiment without departing from the scope of the present invention. For example, the telephone network may be arranged to forward an Internet access request from the exchange 5 to an alternative exchange, when the first exchange does not have sufficient capacity to satisfy the request. This transfer may apply both to first-time requests and to multilink requests. In the case of the latter, the transfer may be done in the same way as described above for the intra-exchange IAS-to-IAS transfer.

Whilst the above embodiment has been described with reference to Multilink PPP, any similar protocol may be used which allows two or more distinct channels to be effectively merged into a single higher bandwidth channel, for example Multilink+ PPP. In another modification, the PPP or MP connection is established between the IAS and the server of the LAN 2. The server then routes data to and from the subscriber terminals connected to the LAN.

What is claimed is:

1. A method of connecting a terminal to a data network, wherein the connection is made through one of a plurality of data network access servers coupled to the data network, the method comprising:

receiving an initial data network access request from the terminal, the request being directed to a first address predefined at the terminal, wherein said first address predefined at the terminal is a first telephone number (B-number);

in response to said initial request, allocating to the terminal a first transmission channel on one of the data network access servers for which the in-use fraction of the communication bandwidth is less than a predefined fraction;

delivering to the terminal a new data network access address using an appropriate protocol, wherein said new data network access address is a second telephone number (B-number);

receiving a subsequent access request from the terminal directed to said new data network access address;

in response to said subsequent access request, allocating to the terminal a further transmission channel on the data network access server on which said first channel is already provided, even if the in-use fraction of the communication bandwidth of the data network access server exceeds said predefined fraction.

2. A method according to claim 1, wherein the data network is the Internet, said appropriate protocol is a multilink point to point protocol (PPP), and the data network access servers are Internet access servers.

3. A method according to claim 1, wherein the network access servers are provided at a single switching center to which access requests from the terminal are directed.

4. A method according to claim 1, wherein the network access servers are distributed over several switching centers, where access requests are forwarded between switching centers depending upon demand.

5. A method according to claim 4, wherein each said switching center at which the data network access servers are provided is an exchange of a telephone network and the terminal is connected to the exchange(s) via one of a telephone line of the telephone network and a wireless telephone communication channel.

6. A method according to claim 5, wherein the terminal is connected to a further data network, and through that network to the switching center(s).

7. Apparatus for connecting a terminal to a data network, the apparatus comprising:

a plurality of data network access servers coupled to the data network;

first receiving means for receiving an initial data network access request from the terminal, the request being directed to a first address predefined at the terminal, wherein said first address predefined at the terminal is a first telephone number (B-number);

first control means arranged, in response to said initial request, to allocate to the terminal a first transmission channel on one of the data network access servers for which the in-use fraction of the communication bandwidth is less than a predefined fraction;

transmission means for transmitting to the terminal a new data network access address using an appropriate protocol (PPP), wherein said new data network access address is a second telephone number (B-number);

second receiving means for receiving a subsequent access request from the terminal directed to said new data network access address; and second control means arranged, in response to said subsequent request, to allocate to the terminal a further transmission channel on the data network access server on which said first channel is already provided, even if the in-use fraction of the communication bandwidth of the data network access server exceeds said predefined fraction.

8. Apparatus according to claim 7, wherein the data network is the Internet, said appropriate protocol is a multilink point to point protocol and said data network access servers are Internet access servers.

9. Apparatus according to claim 8, wherein the apparatus comprises a plurality of switching centers amongst which the Internet access servers are distributed.

10. Apparatus according to claim 9, wherein the switching centers are exchanges of a telephone network, and the network comprises one of a telephone line, and a wireless radio telephone line, coupling the terminal to the exchanges.

11. A method according to claim 3 wherein said single switching center at which the data network access servers are provided is an exchange of a telephone network and the terminal is connected to the exchange via one of a telephone line of the telephone network and a wireless telephone communication channel.

* * * * *